United States Patent [19]

Okada et al.

[11] Patent Number: 4,677,178

[45] Date of Patent: Jun. 30, 1987

[54] SILICONE-BASED TEXTILE FINISHING AGENT

[75] Inventors: Fumio Okada, Takasaki; Masaki Tanaka; Hiroshi Ohashi, both of Annaka, all of Japan

[73] Assignee: Shin-Etsu Chemical Co., Ltd., Tokyo, Japan

[21] Appl. No.: 846,261

[22] Filed: Mar. 31, 1986

[30] Foreign Application Priority Data

Apr. 5, 1985 [JP] Japan ................... 60-72180

[51] Int. Cl.$^4$ ............................................ C08G 77/04
[52] U.S. Cl. ..................................... 528/34; 524/837; 524/860; 528/30
[58] Field of Search .................. 524/837, 860; 528/30, 528/34

[56] References Cited

U.S. PATENT DOCUMENTS

| | | | |
|---|---|---|---|
| 3,661,816 | 5/1972 | Pepe et al. | 528/30 |
| 3,692,865 | 9/1972 | Lengick | 528/30 |
| 3,719,632 | 3/1973 | Lengick | 528/30 |

*Primary Examiner*—Melvyn I. Marquis
*Attorney, Agent, or Firm*—Hopgood, Calimafde, Kalil, Blaustein & Judlowe

[57] ABSTRACT

The silicone-based textile finishing agent comprises (a) an organopolysiloxane having at least one hydrocarbyl group substituted with a phosphate ester group —PO(OR)$_2$, in which R is a monovalent hydrocarbon group, (b) an alkoxy silane having at least one organofunctional group such as amino and epoxy groups in a molecule, and, optionally, (c) a catalyst capable of promoting the reaction between the components (a) and (b), preferably, in the form of an aqueous emulsion. The textile finishing agent is capable of imparting excellent softness and slipperiness to the textile materials such as waddings of polyester or acrylic fibers treated therewith without the disadvantage of yellowing by heat treatment.

6 Claims, No Drawings

SILICONE-BASED TEXTILE FINISHING AGENT

BACKGROUND OF THE INVENTION

The present invention relates to a silicone-based textile finishing agent or, more particularly, to a silicone-based textile finishing agent capable of imparting soft and slippery touch to a wadding of polyester or acrylic fibers without causing a disadvantage of yellowing and the like even when the wadding is brought under a condition of elevated temperatures.

As is well known, various types of textile finishing agents for softening and lubricating treatment are formulated with an organopolysiloxane composition or silicone and they are consumed in large quantities in the textile industry. Several different types of organopolysiloxane compositions are proposed in the prior art for the respective specific object of the textile finishing treatment including a composition comprising an amino compound and an epoxy-containing silicone or an epoxy compound and an amino-containing silicone as is disclosed in Japanese Patent Publication No. 48-17514, a composition comprising a latex-like emulsion of a dimethylpolysiloxane terminated at both molecular chain ends each with a silanolic hydroxy group containing an amino alkoxy silane and a metal-containing catalyst as is disclosed in Japanese Patent Publication No. 51-37996 for the finishing treatment of synthetic fibers such as polyester, acrylic and nylon fibers in which soft and slippery touch is essential and a composition comprising an amino-modified liquid organopolysiloxane for the softening treatment of woven and knit fabrics as is disclosed in Japanese Patent Publication No. 59-26707.

All of these conventional silicone-based textile finishing agents rely on the modification of organopolysiloxanes with amino groups for their effectiveness to impart softness and slipperiness to the textile materials so that they are unavoidably accompanied by a very serious disadvantage that the textile material finished therewith is subject to yellowing to have a greatly decreased value as commercial goods when the finishing treatment of the textile material has been undertaken at an elevated temperature or the finished textile is subsequently brought under a condition of elevated temperatures. Accordingly, it is eagerly desired in the textile industry to develop a novel textile finishing agent capable of imparting further increased softness and slipperiness to the textile materials finished therewith without the above mentioned disadvantages and problems in the prior art silicone-based textile finishing agents.

SUMMARY OF THE INVNETION

The silicone-based textile finishing agent of the invention, which is free from the above described problems and disadvantages in the prior art, is an organopolysiloxane composition which comprises:

(a) 100 parts by weight of an organopolysiloxane modified with phosphate ester groups;

(b) from 1 to 50 parts by weight of an organo alkoxy silane having organofunctionality; and optionally, (c) up to 50 parts by weight of a catalyst which is effective to promote the reaction between the components (a) and (b).

DETAILED DESCRIPTION OF THE PREFERRED EMBODIMENTS

As is understood from the above given summarizing description, the most characteristic feature of the inventive textile finishing agent is in the unique combination of the phosphate ester-modified organopolysiloxane as the component (a) and the organofunctional alkoxy silane as the component (b). In comparison with a textile finishing agent comprising the phosphate ester-modified organopolysiloxane alone which may exhibit a strong softening effect on the textile material finished therewith, the inventive textile finishing agent comprising the components (a) and (b), preferably, together with the catalyst as the component (c) is further advantageous in respect of the higher effect to impart softness and slipperiness to the textile material, durability of the effect to withstand laundering and dry cleaning, remarkable decrease of the coefficient of friction of the textile material finished therewith and absence of disadvantageous yellowing in the textile material finished therewith even when the finishing treatment has been undertaken at an elevated temperature.

The organosilicon compound modified with phosphate ester groups as the component (a) of the inventive organopolysiloxane composition is an organopolysiloxane in which a phosphate ester group is bonded to the silicon atom through a divalent hydrocarbon group. Such a phosphate estermodified organopolysiloxane can be prepared by the emulsion polymerization of:

(i) an organopolysiloxane compound represented by the general formula

$$R^1_a R^2_b SiO_{(4-a-b)/2}, \tag{I}$$

in which $R^1$ is a substituted or unsubstituted monovalent hydrocarbon group having 1 to 20 carbon atoms, $R^2$ has the same meaning as $R^1$ or is a group of the formula —OX, X being a hydrogen atom or the same hydrocarbon group as $R^1$, and the subscripts a and b are each zero or a positive number not exceeding 3 with the proviso that $1 \leq a+b < 4$; and (ii) an alkoxy silane compound having a phosphate ester group represented by the general formula

$$(R^3O)_{3-c}R^4_c SiR^5 PO(OR^6)_2, \tag{II}$$

in which $R^3$, $R^4$ and $R^6$ each have the same meaning as $R^1$ defined above, $R^5$ is a divalent hydrocarbon group having 1 to 8 carbon atoms and c is zero, 1 or 2;

in an aqueous medium in the presence of:

(iii) a surface active agent of the sulfonic acid type or sulfate ester type. Alternatively, the component (a) may be a liquid organopolysiloxane prepared by the equilibration polymerization of the above mentioned (i) organopolysiloxane compound and (ii) alkoxy silane compound in the presence of an acidic catalyst such as concentrated sulfuric acid and trifluoromethane sulfonic acid followed by neutralization of the acidic catalyst.

The organopolysiloxane compound as the reactant (i) is represented by the above given general formula (I), in which $R^1$ is a monovalent hydrocarbon group having 1 to 20 carbon atoms exemplified by alkyl groups, e.g. methyl, ethyl, propyl and butyl groups, alkenyl groups, e.g. vinyl and allyl groups, aryl groups, e.g. phenyl and naphthyl groups, and alkaryl groups, e.g. tolyl and xylyl groups, as well as those substituted groups obtained by replacing a part or all of the hydrogen atoms in the above named hydrocarbon groups with halogen atoms, cyano groups and the like. The group denoted by $R^2$ can be the same hydrocarbon group as $R^1$, a hydrocarbyloxy group of the formula $-OR^1$ or a hydroxy group $-OH$. The subscripts a and b are each zero or a positive number not exceeding 3 with the proviso that $a+b$ is not smaller than 1 but smaller than 4. The organosilicon compound of the general formula (I) is an organosilane compound when $a+b$ is equal to 4 and such an organosilane compound can be used, if desired, in combination with the organopolysiloxane compound. The molecular configuration of the organopolysiloxane compound can be straightly linear, branched chainlike or cyclic. The molecular chain end of the organopolysiloxane compound may be terminated with a trihydrocarbylsilyl, e.g. trialkylsilyl, group or a silanolic hydroxy group. Typical organopolysiloxane compound suitable as the reactant (i) is exemplified by linear and cyclic diorganopolysiloxanes including those expressed by the following structural formulas, in which the symbols Me, Ph and Vi each denote methyl, phenyl and vinyl groups, respectively, and the subscripts m, n, s, t, u, v and r are each a positive integer

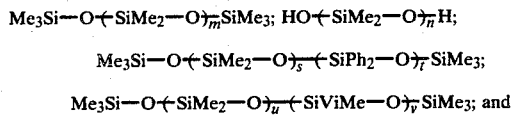

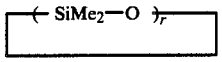

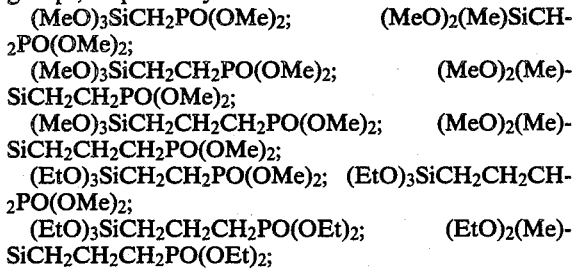

The reactant (ii) to be reacted with the above described organopolysiloxane compound as the reactant (i) is an alkoxy silane compound having a phosphate ester group and represented by the above general formula (II) In the formula, each of the groups denoted by $R^3$, $R^4$ and $R^6$ is a monovalent hydrocarbon group selected, independently from the others, from the class consisting of alkyl groups, e.g. methyl, ethyl, propyl, butyl, hexyl, octyl and dodecyl groups, alkenyl groups, e.g. vinyl and allyl groups, aryl qroups, e.g. phenyl and naphthyl groups, alkaryl groups, e.g. tolyl and xylyl groups, and cycloalkyl groups, e.g. cyclohexyl group, as well as those substituted groups obtained by replacing a part or all of the hydrogen atoms in the above named hydrocarbon groups with halogen atoms, cyano groups and the like. The group denoted by $R^5$ is a divalent hydrocarbon group such as methylene, ethylene, propylene and butylene groups, which serves to link the silicon atom and the phosphorus atom of the phosphate ester group. The subscript c is zero, 1 or 2. Particular examples of the phosphate ester-substituted alkoxy silane include those compounds expressed by the following structural formulas, in which the symbols Me, Et, Oc and Dd denote methyl, ethyl, octyl and dodecyl groups, respectively:

$(MeO)_3SiCH_2PO(OMe)_2$; $(MeO)_2(Me)SiCH_2PO(OMe)_2$;
$(MeO)_3SiCH_2CH_2PO(OMe)_2$; $(MeO)_2(Me)SiCH_2CH_2PO(OMe)_2$;
$(MeO)_3SiCH_2CH_2CH_2PO(OMe)_2$; $(MeO)_2(Me)SiCH_2CH_2CH_2PO(OMe)_2$;
$(EtO)_3SiCH_2CH_2PO(OMe)_2$; $(EtO)_3SiCH_2CH_2CH_2PO(OMe)_2$;
$(EtO)_3SiCH_2CH_2CH_2PO(OEt)_2$; $(EtO)_2(Me)SiCH_2CH_2CH_2PO(OEt)_2$;
$(EtO)_3SiCH_2CH_2CH_2PO(OOc)_2$; $(EtO)_3SiCH_2CH_2CH_2PO(ODd)_2$;
$(EtO)_2(Me)SiCH_2CH_2CH_2PO(ODd)_2$; and
$(EtO)(Me)_2SiCH_2CH_2CH_2PO(OEt)_2$.

The above described phosphate ester-substituted alkoxy silane compound can be readily prepared by the dehydrochlorination reaction between a chloroalkyl alkoxy silane such as 2-chloroethyl trimethoxy silane $(MeO)_3SiCH_2CH_2Cl$ and a phosphonic acid ester such as diethyl phosphonate $HPO(OEt)_2$. The amount of the phosphate ester-substituted alkoxy silane to be reacted with the organopolysiloxane compound as the reactant (i) should be in the range from 0.1 to 30 parts by weight per 100 parts by weight of the reactant (i). When the amount thereof is too small, the resultant organopolysiloxane latex may be less film-forming with decreased bonding strength to the synthetic fibers treated with the composition. When the amount thereof is too large, on the other hand, the stability of the emulsion in the latex may be decreased due to the alcohol produced as a by-product in the latex. It is a preferable way in carrying out the emulsion polymerization of the organosilicon compound as the reactant (i) and the phosphate ester-substituted alkoxy silane compound as the reactant (ii) that the reactant (ii) is dissolved in the reactant (i) in advance prior to emulsification in water.

The surface active agent as the ingredient (iii) used in the above mentioned emulsion polymerization naturally acts as an emulsifier for the reactants (i) and (ii) in the aqueous medium. It should be noted, however, that the surface active agent should serve also as a catalyst to promote the reaction between the reactants (i) and (ii) in an emulsified state in the aqueous medium so that the surface active agent should preferably be selected from sulfonic acid type and sulfate ester type ones including 4-alkyl-substituted benzene sulfonic acids of the general formula $R^8C_6H_4SO_3H$ and polyoxyethylene sulfates of the general formula $R^9(OC_2H_4)_nOSO_3H$, respectively, in which $R^8$ is an aliphatic monovalent hydrocarbon group having at least 6 carbon atoms, $R^9$ is an aliphatic monovalent hydrocarbon group having at least 6 carbon atoms or an aryl group substituted by an aliphatic monovalent hydrocarbon group and n is a positive integer of 1 to 15. Particular examples of the surface active agent include those expressed by the following formulas, in which $-C_6H_4-$ is a 1,4-phenylene group: $C_6H_{13}-C_6H_4-SO_3H$; $C_8H_{17}-C_6H_4-SO_3H$; $C_{10}H_{21}-C_6H_4-SO_3H$; $C_{12}H_{25}-C_6H_4-SO_3H$; $C_{14}H_{29}-C_6H_4-SO_3H$; $C_8H_{17}(OC_2H_4)_2OSO_3H$; and $C_{10}H_{21}(OC_2H_4)_2OSO_3H$.

Alternatively, the surface active agent may be a sulfate ester salt represented by the general formula $R^{10}OSO_3M$, in which $R^{10}$ is an aliphatic monovalent hydrocarbon group having at least 6 carbon atoms, optionally, contaning a polyoxyethylene linkage and M is an atom of an alkali metal such as sodium and potassium, including sodium lauryl sulfate, sodium polyoxyethylene dodecylphenyl ether sulfate and the like. Although such a sulfate ester salt type surface active agent has a sufficiently high emulsifying power as such for the reactants (i) and (ii), it is not catalytically active for the reaction therebetween so that the surface active agent in the salt form should be converted into the catalytically active free acid form subsequently to emulsification by bringing the emulsion into contact with a cation exchange resin in the H-form.

It is optional that the surface active agents of the sulfonic acid type and sulfate ester type are used in combination whereby the stability of the aqueous emulsion is further increased also with a favorable effect on the catalytic promotion of the reaction.

The amount of the surface active agent added to the aqueous medium should be in the range from 0.5 to 30 parts by weight or, preferably, 1 to 10 parts by weight per 100 parts by weight of the reactant (i). When the amount thereof is too small, the emulsion is not sufficiently stable with undue extension of the reaction time as a matter of course. When the amount thereof is too large, on the other hand, disadvantages are caused that the uniformity of the film formed of the composition is decreased with also decreased heat resistance due to the excessively large amount of the surface active agent contained therein though with improved stability of the emulsion.

In carrying out the reaction of the reactants (i) and (ii) in an aqueous medium in the presence of the above described surface active agent, the amount of water as the aqueous medium should be in the range from 100 to 500 parts by weight per 100 parts by weight of the reactant (i). The reaction per se can be performed according to a known procedure. For example, the surface active agent is first dissolved in water under agitation and then the organopolysiloxane as the reactant (i) and the phosphate ester-substituted alkoxy silane as the reactant (ii) are added to the aqueous medium to be emulsified therein followed by a treatment in a colloid mill to impart stability to the aqueous emulsion which is agitated for a length of time from several hours to a week at a temperature in the range from room temperature to 80° C. When the catalytic activity of the surface active agent is not sufficiently high as desired to promote the reaction, it is optional to supplement the activity by the addition of a small amount of a strongly acidic compound, such as sulfuric acid, hydrochloric acid, trifluoroacetic acid, trifluoromethane sulfonic acid and the like, to the reaction mixture so that the reaction can proceed more smoothly and more rapidly.

Although the organopolysiloxane latex prepared in the above described manner can be used as such, it is sometimes preferable according to need to neutralize the residual acidic material contained therein by adding an alkali such as sodium carbonate, sodium hydroxide, triethanolamine and the like.

It is further optional that the above described surface active agent is used in combination with a non-ionic surface active agent according to need so as to further increase the stability of the emulsion. The latex may optionally be admixed with a known antiseptic agent, dye and the like additives in such an amount that no adverse effect is caused in the stability of the emulsion.

The component (b) comprised in the inventive organopolysiloxane as a textile finishing agent is an alkoxy silane having organofunctionality. The organofunctionality here implied is given to the alkoxy silane when the silane has at least one functional group such as amino, epoxy, carboxyl, acryloxy, carbinol, mercaptoalkyl and the like groups in a molecule. Namely, the alkoxy silane compound is represented by the general formula $Z-R^{11}Si(R^{12})_d(OR^{13})_{3-d}$, in which Z is a functional group exemplified by the above named groups, $R^{11}$ is a divalent organic group which may contain an atom of oxygen or sulfur, $R^{12}$ and $R^{13}$ are each a monovalent hydrocarbon group having 1 to 20 carbon atoms selected from the same class of the groups given as the examples of $R^1$ and the subscript d is zero, 1 or 2.

Particular examples of the organofunctional alkoxy silane defined above include those compounds expressed by the following formulas, in which the symbols Me, Et, Gl and Ec denote methyl, ethyl, glycidyl and 3,4-epoxy cyclohexyl groups, respectively:

$(MeO)_3SiCH_2CH_2CH_2NH_2$; $(MeO)_2(Me)SiCH_2CH_2CH_2NH_2$;
$(MeO)(Me)_2SiCH_2CH_2CH_2NH_2$; $(EtO)_3SiCH_2CH_2CH_2NH_2$;
$(EtO)_2(Me)SiCH_2CH_2CH_2NH_2$; $(EtO)(Me)_2SiCH_2CH_2CH_2NH_2$;
$(MeO)_3SiCH_2CH_2CH_2NHCH_2CH_2NH_2$;
$(MeO)_2(Me)SiCH_2CH_2CH_2NHCH_2CH_2NH_2$;
$(MeO)(Me)_2SiCH_2CH_2CH_2NHCH_2CH_2NH_2$;
$(MeO)_3SiCH_2CH_2CH_2OGl$; $(MeO)_2(Me)SiCH_2CH_2CH_2OGl$;
$(EtO)_3SiCH_2CH_2CH_2OGl$; $(EtO)_2(Me)SiCH_2CH_2CH_2OGl$;
$(MeO)_3SiCH_2CH_2Ec$; $(MeO)_2(Me)SiCH_2CH_2Ec$;
$(EtO)_2(Me)SiCH_2CH_2Ec$; $(MeO)_3SiCH_2CH_2CH_2OCOC(Me)=CH_2$;
$(MeO)_2(Me)SiCH_2CH_2CH_2OCOC(Me)=CH_2$;
$(MeO)_3SiCH_2CH_2CH_2SH$; $(MeO)_2(Me)SiCH_2CH_2CH_2SH$;
$(MeO)_3SiCH_2CH_2CH_2SCH_2CH_2COOH$; and
$[(MeO)_3SiCH_2CH_2CH_2N(Me)_2C_{18}H_{37}]^+Cl^-$.

The amount of the above described component (b) in the inventive composition should be in the range from 1 to 50 parts by weight or, preferably, from 10 to 30 parts by weight per 100 parts by weight of the component (a). When the amount thereof is too small, the textile material treated with the textile finishing agent is imparted only insufficiently with slipperiness and launderability. When the amount thereof is too large, on the other hand, stiffness appears in the film formed of the composition so that the textile material finished with the composition loses slipperiness.

The textile finishing agent of the present invention is prepared by blending the organopolysiloxane compound modified with phosphate ester groups as the component (a) and the organofunctional alkoxy silane as the component (b) in a specified proportion and can be used as such. It is optional, however, that the mixture is diluted, when the component (a) is in the form of an aqueous emulsion, with water or, when otherwise, with an organic solvent such as toluene, xylene, trichloroethylene, trichloroethane, perchloroethylene, kerosine and the like before it is used for the treatment of textile finishing.

The treatment of a textile material with the inventive textile finishing agent can be performed in a known procedure. For example, a wadding of polyester or acrylic fibers is dipped in the treatment liquid of the composition to be soaked therewith and the excessive volume of the liquid is removed by squeezing or by centrifuging followed by a heat treatment at a temperature of 50° to 200° C. so that a cured film of the organopolysiloxane is formed on the surface of the fibers. The thus finished textile material is imparted with excellent softness, slipperiness and lubricity with a greatly decreased coefficient of friction and the effect obtained by the treatment can withstand laundering and dry cleaning in addition to the advantage of absence of yellowing of the textile by heating. Therefore, the staples of synthetic fibers finished in this manner are useful as such without conventional post-treatment procedures as a wadding or stuffing material in bedding mats and pillows and in handicraft articles such as stuffed toys.

Further, textile materials after a crimpling treatment of fibers can be imparted with more pleasant touch by the treatment with the inventive textile finishing agent.

In the above mentioned procedure of textile finishing with the inventive composition, reaction takes place between the components (a) and (b) on the fiber surface. Although the reaction can proceed in the absence of any catalyst, it is preferable that the inventive textile finishing agent is admixed with a catalyst as the component (c) to accelerate the reaction. Exemplary of the catalyst in this case are various metal salts of carboxylic acids, organometallic salts of carboxylic acids and metal alkoxides including magnesium acetate, zinc formate, zinc acetate, zirconium acetate, zinc octoate, cobalt octoate, lead octoate, tetraisopropyl titanate, tetrabutyl titanate, dibutyltin diacetate, dibutyltin dilaurate, dibutyltin dioctoate, dioctyltin diacetate, dioctyltin dilaurate, dioctyltin maleate and the like as well as platinum compounds such as chloroplatinic acid. Although the catalyst is not essential in the inventive textile finishing agent, it is preferable to add an appropriate amount of the catalyst to the composition in order to obtain a further stabilized effect of the treatment. The amount of the catalyst in the composition should not exceed 50 parts by weight per 100 parts by weight of the phosphate ester-modified organopolysiloxane as the component (a).

In addition to the above described components (a), (b) and, optionally, (c), the inventive textile finishing agent can be admixed with various kinds of known additives conventionally used in textile finishing agents including cationic and non-ionic antistatic agents such as quaternary ammonium compounds and polyoxyethylene compounds.

In the following, the textile finishing agent of the invention is illustrated in more detail by way of examples and comparative examples.

EXAMPLES 1 TO 4 AND COMPARATIVE EXAMPLES 1 TO 4.

Into an aqueous solution of 10 g of dodecylbenzene sulfonic acid dissolved in 680 g of water contained in a 2-liter glass beaker were added 300 g of octamethyl cyclotetrasiloxane and 10 g of a phosphate ester-substituted alkoxy silane of the formula $(EtO)_3SiCH_2CH_2PO(OEt)_2$ and the mixture was emulsified using a high-speed mixer and then uniformized in a colloid mill to give a stable aqueous emulsion. Thereafter, the emulsion was heated at 70° C. for 16 hours followed by neutralization by adding an aqueous solution of sodium carbonate to give a latex-like emulsion of a dimethylpolysiloxane modified with the phosphate ester-substituted alkoxy silane, which is referred to as Latex A hereinbelow. The Latex A contained 28% by weight of non-volatile matter after heating at 100° C. for 3 hours and the dried film thereof had rubber-like elasticity.

Separately, 20 g of a phosphate ester-substituted alkoxy silane of the formula $(MeO)_2(Me)SiCH_2CH_2CH_2PO(OC_{12}H_{25})_2$ were dissolved in 300 g of octamethyl cyclotetrasiloxane contained in a 2-liter glass beaker and the mixture was admixed with and emulsified in an aqueous solution of 10 g of sodium lauryl sulfate in 670 g of water into a stable aqueous emulsion by use of a colloid mill. Thereafter, 50 g of a cation exchange resin (Amberlite 200, a product by Organo Co.) in the H-form were added to the emulsion and agitated for 1 hour at room temperature followed by filtration to remove the ion exchange resin, heating at 70° C. for 10 hours and, finally, neutralization by adding an aqueous solution of sodium carbonate to have a pH of 7. The thus obtained latex-like emulsion, referred to as the Latex B hereinbelow, of a highly polymerized dimethylpolysiloxane modified with the phosphate ester-substituted alkoxy silane contained 29.5% by weight of non-volatile matters by drying at 100° C. for 3 hours and the dried film thereof had soft rubber-like elasticity.

For comparison, another latex-like emulsion of dimethylpolysiloxane, referred to as the Latex C hereinbelow, was prepared in the following manner. Thus, 350 g of octamethyl cyclotetrasiloxane taken in a 2-liter glass beaker were admixed with and dispersed in an aqueous solution of 10 g of dodecylbenzene sulfonic acid dissolved in 640 g of water under vigorous agitation and emulsified by use of a colloid mill into a stable aqueous emulsion which was heated at 50° C. for 16 hours followed by neutralization by adding an aqueous solution of sodium carbonate to give a highly polymerized polydimethylsiloxane terminated at both molecular chain ends each with a silanolic hydroxy group. Drying of the Latex C by heating at 100° C. for 3 hours gave 30.2% by weight of non-volatile matters.

Textile-treatment liquids were prepared each by blending 6.0 parts by weight of either one of the Latices A, B and C with 1.0 part by weight of an amino-containing alkoxy silane of the formula $(MeO)_2(Me)SiCH_2CH_2CH_2NHCH_2CH_2NH_2$, referred to as amino alkoxy silane, or a glycidyloxy-containing alkoxy silane of the formula $(EtO)_2(Me)SiCH_2CH_2CH_2OGl$, referred to as epoxy alkoxy silane hereinbelow, 1.0 part by weight of an aqueous emulsion of dibutyltin dioctoate, referred to as the Catalyst-I hereinbelow, prepared by emulsifying 20 parts of dibutyltin dioctoate in an aqueous solution of 2 parts of a polyoxyethylene alkyl ether as a non-ionic surface active agent in 78 parts of water and water in an amount indicated in Table 1 below. In Comparative Examples 1, 2 and 4, the amino alkoxy silane or epoxy alkoxy silane and the Catalyst-I were omitted in the formulation of the treatment liquid.

A wadding of polyester fibers was dipped in the thus prepared treatment liquid for 30 seconds to be soaked by the liquid and then freed from the excessive volume of the liquid using a centrifuge followed by drying at 150° C. for 30 minutes to give a treated wadding of which the touch was examined organoleptically by hand touching to give the results shown in Table 1 which also includes the results of organoleptic test for the touch of the treated waddings after three times of laundering according to the procedure specified in JIS L 0821 and after a dry cleaning treatment according to the procedure specified in JIS L 0860. The touch of the wadding in the table is given in 4 ratings of A, B, C and D corresponding to an excellent, good, fair and poor touch, respectively. The table also shows the extent of yellowing of the waddings after the treatment with the treatment liquid in 4 ratings of A, B, C and D corresponding to absolute absence of yellowing, very slight yellowing, slight but clearly noticeable yellowing and badly remarkable yellowing, respectively.

Separately, polyester filaments were dipped for 30 seconds in the treatment liquid and, after removal of the excessive volume of the liquid by centrifuging, dried by heating at 150° C. for 5 minutes to give treated filaments of which the coefficients of static friction and kinematic friction were measured on a Roeder-type instrument for the determination of coefficient of friction to give the results of filament-to-filament friction shown in Table 1.

zero, 1 or 2, in an aqueous medium in the presence of

TABLE 1

|  |  |  | Example | | | | Comparative Example | | | |
|---|---|---|---|---|---|---|---|---|---|---|
|  |  |  | 1 | 2 | 3 | 4 | 1 | 2 | 3 | 4 |
| Formulation | Latex | | A | B | A | B | A | B | C | C |
| | Amino alkoxy silane | | Yes | Yes | No | No | No | No | Yes | No |
| | Epoxy alkoxy silane | | No | No | Yes | Yes | No | No | No | No |
| | Catalyst-I | | Yes | Yes | Yes | Yes | No | No | Yes | No |
| | Water, parts by weight | | 92.0 | 92.0 | 92.0 | 92.0 | 94.0 | 94.0 | 92.0 | 94.0 |
| Wadding | Touch | As treated | A | A | A | A | B | B | B | D |
| | | After laundering | A | A | A | A | C | C | B | D |
| | | After dry cleaning | A | A | A | A | C | C | B | D |
| | Yellowing | | B | B | A | A | A | A | D | B |
| Filament | Coefficient of friction | 90 cm/ minute Static | .0973 | .1023 | .1035 | .1051 | .1396 | .1451 | .1108 | .1686 |
| | | Kinematic | .1503 | .1852 | .1655 | .1973 | .2339 | .2416 | .2115 | .2596 |
| | | 12 cm/ minute Static | .1387 | .1452 | .1107 | .1256 | .1340 | .1420 | .1555 | .1515 |
| | | Kinematic | .2115 | .2185 | .2168 | .2194 | .2451 | .2476 | .2346 | .2291 |

What is claimed is:

1. A silicone-based textile finishing agent which comprises:
   (a) 100 parts by weight of an organopolysiloxane compound modified with a phosphate ester group, wherein the organopolysiloxane compound is in the form of an aqueous emulsion prepared by the emulsion polymerization of
   (i) an organopolysiloxane compound represented by the general formula $R^1_a R^2_b SiO_{(4-a-b)/2}$, in which $R^1$ is a substituted or unsubstituted monovalent hydrocarbon group having 1 to 20 carbon atoms, $R^2$ has the same meaning as $R^1$ or is a group of the formula —OX, X being a hydrogen atom or the same hydrocarbon group as $R^1$, and the subscripts a and b are each zero or a positive number not exceeding 3 with the proviso that a+b is not smaller than 1 but smaller than 4,
   (ii) an alkoxy silane compound having a phospate ester group represented by the general formula $(R^3O)_{3-c}R^4_c SiR^5 PO(OR^6)_2$, in which $R^3$, $R^4$, and $R^6$ each have the same meaning as $R^1$ defined above, $R^5$ is a divalent hydrocarbon group having 1 to 8 carbon atoms and the subscript c is zero, 1 or 2, in an aqueous medium in the presence of
   (iii) a sulfonic acid surface active agent or sulfonic ester surface active agent, and
   (b) from 1 to 50 parts by weight of an organoalkoxy silane having at least one organofunctional group in a molecule selected from the class consisting of amino, epoxy, carboxyl, acryloxy, carbinol, and maercaptoalkyl.

2. The silicone-based textile finishing agent as claimed in claim 1 which further comprises:
   (c) up to 50 parts by weight of a catalyst capable of promoting the reaction between the components (a) and (b) per 100 parts by weight of the component (a).

3. The silicone-based textile finishing agent as claimed in claim 1 wherein the divalent hydrocarbon group denoted by $R^5$ is selected from the class consisting of methylene, ethylene, propylene and butylene groups.

4. The silicone-based textile finishing agent as claimed in claim 1 wherein the surface active agent is an alkylbenzene sulfonic acid or an polyoxyethylene glycol monohydrocarbyl ether sufate.

5. The silicone-based textile finishing agent as claimed in claim 1 wherein the organofunctional group is an amino group or an epoxy group.

6. The silicone-based textile finishing agent as claimed in claim 2 wherein the catalyst is a metal salt of a carboxylic acid, an organometallic salt of a carboxylic acid or a metal alkoxide.

* * * * *